United States Patent [19]

Aneha

[11] Patent Number: 5,628,631
[45] Date of Patent: May 13, 1997

[54] RADIO CONTROL TRANSMITTER

[75] Inventor: Akira Aneha, Mobara, Japan

[73] Assignee: Futaba Denshi Kogyo Kabushiki Kaisha, Mobara, Japan

[21] Appl. No.: 278,966

[22] Filed: Jul. 22, 1994

[30] Foreign Application Priority Data

Jul. 23, 1993 [JP] Japan ................................ 5-202117

[51] Int. Cl.$^6$ ............................................ A63H 30/04
[52] U.S. Cl. ............................................ 434/29; 446/456
[58] Field of Search ...................... 446/456; 340/825.69, 340/825.72; 244/130, 196, 197, 221, 229; 434/29, 30, 32–35, 37

[56] References Cited

FOREIGN PATENT DOCUMENTS

| | | | |
|---|---|---|---|
| 2-204198 | 8/1990 | Japan | 244/229 |
| 6-339582 | 12/1994 | Japan | 446/456 |

*Primary Examiner*—Richard J. Apley
*Assistant Examiner*—John Mulcahy
*Attorney, Agent, or Firm*—Oblon, Spivak, McClelland, Maier & Neustadt, P.C.

[57] ABSTRACT

A radio control transmitter capable of preventing a pupil-side radio control transmitter from outputting a radio wave even when a pupil-side operator erroneously closes a power switch of the pupil-side radio control transmitter. The transmitter includes a radio-frequency circuit for modulating a stick operation signal encoded by an encoder and outputting it in the form of a radio wave and a power control section for discriminating which of an internal power supply and an external power supply feeds a power thereto and holding a result of the discrimination therein. The power control section also functions to control switches for feeding the encoder and radio-frequency circuit with a power depending on the discrimination result. A trainer switch is arranged so as to permit a signal to be selectively applied to the radio-frequency circuit 5 from the encoder or a trainer cable. The power control section is fed with a power through the trainer cable from the external power supply or through a diode from the internal power supply,

3 Claims, 7 Drawing Sheets

FIG. 4 (a) CONNECTION a 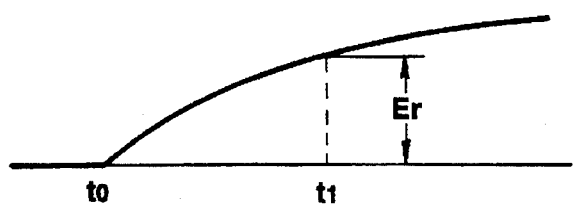
FIG. 4 (b) S.T52 
FIG. 4 (c) COMPARATOR 51 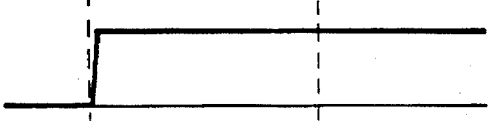
FIG. 4 (d) FF53 

RADIO CONTROL TRANSMITTER

BACKGROUND OF THE INVENTION

This invention relates to a radio control transmitter exhibiting a training function for controlling a radio-controlled airplane, a radio-controlled helicopter or the like, and more particularly to a radio control transmitter which permits a pupil-side radio control transmitter and a teacher-side radio control transmitter to be interconnected through a trainer cable.

A radio-controlled object such as a radio-controlled airplane or a radio-controlled helicopter is generally controlled at a considerable distance between the radio-controlled object and a radio control transmitter. Also, the control requires skill and even a skilled operator often makes a control error. In particular, a beginner is likely to make an error in control to cause an expensive airplane or helicopter to crash, leading to breakage of the airplane or helicopter and therefore breakage of an engine and a receiver each mounted thereon.

In order to eliminate such a control error, two radio control transmitters interconnected as shown in FIG. 6 have been conventionally used for control training of an airplane or the like. A conventional radio control transmitter for the control training is constructed as shown in FIG. 7.

In FIGS. 6 and 7, reference numeral 101 designates a teacher-side radio control transmitter, 102 is a pupil-side radio control transmitter, 103 is a cable called a trainer cable for interconnecting both radio control transmitters 101 and 102 therethrough, 104 and 105 each are a trainer switch for carrying out changing-over between a teacher-side operator and a pupil-side operator, 106 and 107 each are a rod antenna for transmitting a radio wave therethrough, 108 and 109 each are a meter for monitoring, 110, 111, 112 and 113 each are a stick operated by the operator, 114 and 115 each are a power switch, 121 and 123 each are a high-frequency or radio-frequency circuit for outputting an encoded signal in the form of a radio wave, and 122 and 124 each are an encoder circuit encoding the amount of operation of each of the sticks or the like.

Control training by means of the radio control transmitters 101 and 102 interconnected as shown in FIG. 7 is carried out by turning on or closing a power switch of the teacher-side radio control transmitter 101 to activate the radio control transmitter 101 and operating the sticks 110 and 112 to output a radio wave from the high-frequency circuit 121, resulting in taking-off of, for example, an airplane and lifting thereof to a safe altitude.

Then, the teacher-side operator changes over the trainer switch 104, so that the sticks 111 and 113 of the pupil-side radio control transmitter 102 may be operated, resulting in the airplane being placed in a controllable state. Thereafter, the pupil-side operator operates the sticks 111 and 113 to permit control training of the airplane to be carried out.

During control training by the pupil-side operators, only the teacher-side radio control transmitter 101 is kept activated, whereas in the pupil-side radio control transmitter 102, the amount of operation of each of the sticks 111 and 113 is encoded by the encoder circuit 124 and then transmitted in the form of a signal through the trainer cable 103 to the teacher-side radio control transmitter 101.

Then, changing-over of the trainer switch 104 permits an output of the encoder circuit 124 of the pupil-side radio control transmitter 102 to be applied to the high-frequency circuit 121 of the teacher-side radio control transmitter 101.

Thus, control of the airplane can be accomplished through operation of the sticks 211 and 213 of the pupil-side radio control transmitter 102 in place of operation of the sticks 110 and 112 of the teacher-side radio control transmitter 101.

When the airplane falls into an unstable state due to a control error during the control by the pupil-side operator or it is desired to land the airplanes the trainer switch 104 is returned to the original position to permit the teacher-side operator to operate the sticks 110 and 112.

The radio control transmitters 101 and 102 are not constructed for exclusive use for the teacher-side operator and pupil-side operator, respectively. Instead, radio control transmitters which are constructed so as to exhibit the same function are used for the radio control transmitters 101 and 102 and then connected to each other through the trainer cable 103, because such a general-purpose construction increases a value of a radio control transmitter.

Thus, of the radio control transmitters 101 and 102, the transmitter in which the power switch is first closed is determined to be the teacher-side radio control transmitter. Thus, when the power switch 114 is first closed, the radio control transmitter 101 is permitted to act as the teacher-side radio control transmitter, whereas when the power switch 115 is first closed, the radio control transmitter 102 is determined to be the teacher-side radio control transmitter.

In general, a pupil-side operator undergoing control training is typically a beginner, so that the pupil-side operator frequently makes misoperation of the transmitter because it is provided with a lot of switches. In particular, misoperation of an airplane by the pupil-side operator causes the pupil-side operator to be utterly confused, so that he often erroneously closes the power switch 115 of his own radio control transmitter.

Such misoperation causes a power to be fed to the high-frequency circuit 123 of the pupil-side radio control transmitter 102, resulting in the pupil-side radio control transmitter outputting a radio wave, so that a receiver mounted on the airplane experiences radio interference. This causes the airplane to be uncontrolled, leading to crashing or missing of the airplane.

SUMMARY OF THE INVENTION

The present invention has been made in view of the foregoing disadvantage of the prior art.

Accordingly, it is an object of the present invention to provide a radio control transmitter which is capable of preventing a pupil-side radio control transmitter from outputting a radio wave even when a pupil-side operator erroneously closes a power switch of the pupil-side radio control transmitter during control training of the transmitter.

In accordance with the present invention, a radio control transmitter is provided. The radio control transmitter includes an encoder circuit for encoding a stick operation signal, a radio-frequency circuit for modulating the signal encoded and outputting it in the form of a radio wave, a power supply and a power line connected to the power supply, a switch arranged between the radio-frequency circuit and the power line, a connector for external output to which a first line connected to an external power supply, a second line fed with an external signal and a third line connected to an output terminal of the encoder circuit are connected and a power control section for judging which of the first line and the power line is serving for power feed, to thereby interrupt connection between the radio-frequency circuit and the power line when it judges that the first line is serving for power feed.

In a preferred embodiment of the present invention, the power control section comprises a relay for opening the switch when a voltage is applied to the first line.

Also, in accordance with the present invention, a radio control transmitter is provided. The radio control transmitter includes an encoder circuit for encoding a stick operation signal, a radio-frequency circuit for modulating the signal encoded and outputting it in the form of a radio wave, a first switch connected between each of the encoder circuit and high-frequency circuit and a power line, a second switch connected between the encoder circuit and a first line connected to an external power supply, a power switch connected between a power supply and the power line, a power feed discriminating circuit for judging which of the first line and the power line is serving for power feed, a holding circuit for holding a signal output from the power feed discriminating circuit, a power control circuit for controlling the first and second switches depending on a signal output from the holding circuit, a third switch for selectively applying one of the output signal of the encoder and a signal of a second line to the high-frequency circuit, a third line connected to an output terminal of the encoder, and a connector for external output to which at least the first, second and third lines are connected. A power output from the first switch is fed through the second switch to the first line. The transmitter also includes a diode connected in a forward direction to the first line so as to feed a power therethrough to the holding circuit and power control circuit.

In a preferred embodiment of the present invention, the holding circuit holds, until feed of a power thereto is interrupted, an output of the power feed discriminating circuit obtained when any one of the first line and power line is fed with a power.

In the radio control transmitter of the present invention constructed as described above, of the two radio control transmitters interconnected through the trainer cable, the radio control transmitter which has been fed with a power is judged to be a teacher-side radio control transmitter by the power feed discriminating circuit, to thereby prevent a pupil-side radio control transmitter from being fed with a power even when it is fed with a power.

Thus, the present invention effectively prevents the pupil-side radio control transmitter from outputting a radio wave even when a pupil-side operator erroneously closes the power switch of the radio control transmitter to thereby prevent a receiver mounted on an airplane or the like from causing radio interference, resulting in eliminating crashing of the airplane or the like.

Also, the radio control transmitter of the present invention may be effectively used in a normal manner when the trainer cable is detached therefrom.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 4(a) to 4(d) each are a waveform chart showing operation of a power feed discriminating circuit and a holding circuit;

DETAILED DESCRIPTION OF THE PREFERRED EMBODIMENTS

Now, a radio control transmitter according to the present invention will be described hereinafter with reference to FIGS. 1 to 6.

Figure 1:
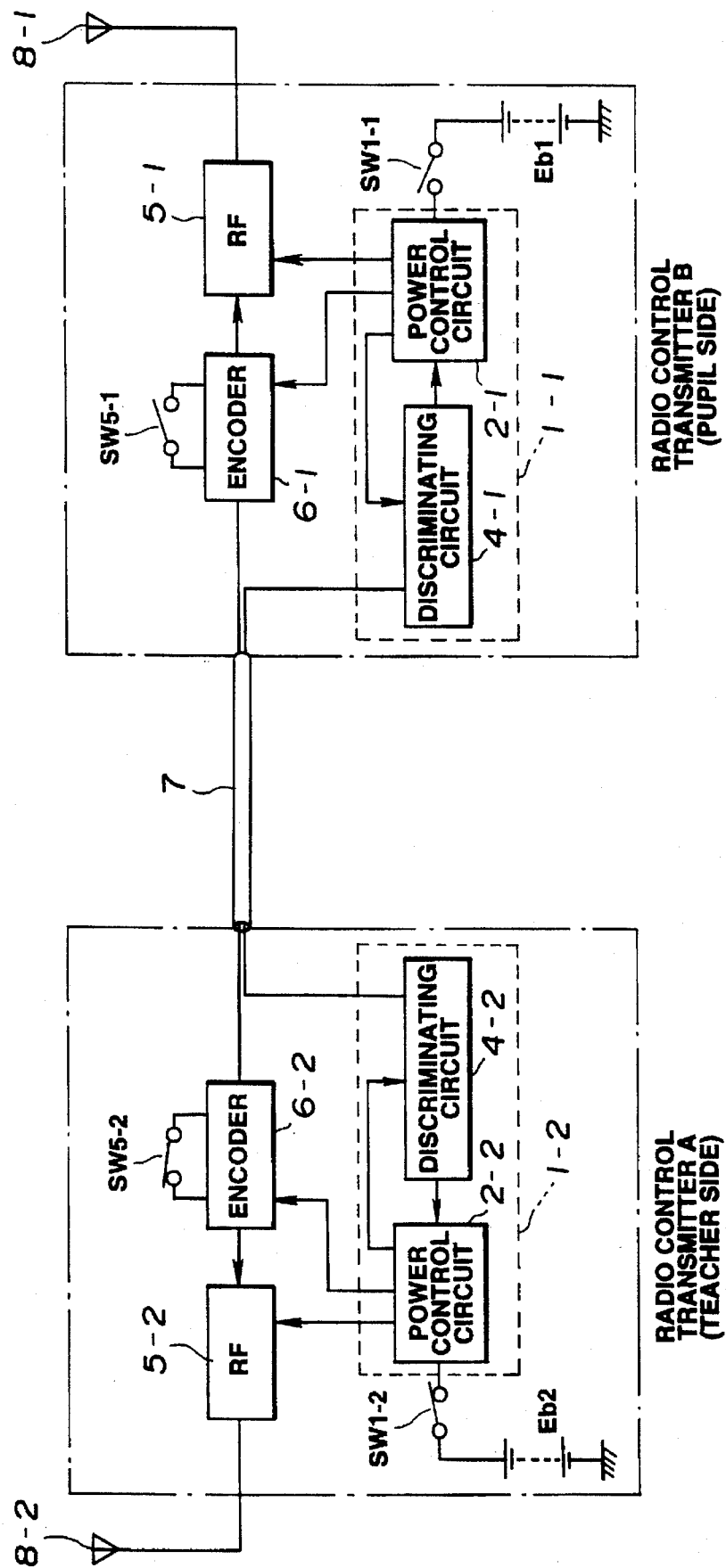
FIG. 1 is a block diagram showing two radio control transmitters constructed according to the present invention and connected to each other through a trainer cable.

Referring first to FIG. 1, two radio control transmitters A and B constructed in accordance with the present invention and interconnected through a trainer cable 7 are shown.

In FIG. 1, reference numerals 1—1 and 1-2 designate power control sections for controlling switches through which powers are applied to encoders 6-1 and 6-2 and high-frequency or radio-frequency circuits 5-1 and 5-2, respectively. 2-1 and 2—2 each are a power control circuit constituting a part of each of the power control sections 1—1 and 1-2. 4-1 and 4-2 are discriminating circuits which cooperate with the corresponding the power control circuits 2-1 and 2—2 to constitute the power control sections 1—1 and 1-2, respectively. The radio-frequency circuits 5-1 and 5-2 function to modulate outputs of the encoder circuits 6-1 and 6-2 and output the modulated outputs in the form of a radio wave. Reference numeral 7 designates a trainer cable through which the radio control transmitters A and B are interconnected. 8-1 and 8-2 each are a rod antenna for outputting a radio wave, SW1—1 and SW1-2 each are a power switch, SW5-1 and SW5-2 each are a trainer switch, and Eb1 and Eb2 each are a power supply.

Control training by means of the radio control transmitters A and B constructed and interconnected as described above is initiated by closing the switch SW1-2 of the teacher-side radio control transmitter A. This causes a power of the power supply Eb2 to be applied to the power control circuit 2—2 and discriminating circuit 4-2. At this time, the power switch SW1—1 of the pupil-side radio control transmitter B is kept open, so that a power of the power supply Eb1 is kept from being transmitted through the trainer cable 7 to the teacher-side radio control transmitter A. This results in the discriminating circuit 4-2 Judging or discriminating that the power switch SW1-2 of the radio control transmitter A is closed and holding a result of the discrimination therein.

The discrimination result thus obtained causes the power control circuit 2—2 to apply the power of the power supply Eb2 to the radio-frequency circuit 5-2 and encoder circuit 6-2, leading to activation of both circuits and feed the power through the trainer cable 7 to the pupil-side radio control transmitter B.

The power of the power supply Eb2 transmitted through the trainer cable 7 to the radio control transmitter B is then applied to the encoder circuit 6-1 and discriminating circuit 4-1. This results in the encoder circuit 6-1 being activated and the discriminating circuit Judging or discriminating that the power switch SW1-2 of the teacher-side radio control transmitter A is closed. A result of the discrimination is held in the discriminating circuit 401.

The discrimination result is fed to the power control circuit 2-1, so that the circuit 2-1 controls the radio-frequency circuit 5-1 and encoder circuit 6-1 so as to keep the power of the power supply Eb1 from being fed to the circuits 5-1 and 6-1 even when the power switch SW1—1 is then closed.

The above-described construction of the radio control transmitter of the illustrated embodiment keeps the pupil-side radio control transmitter B from outputting a radio wave even when the power switch thereof is erroneously closed, to thereby prevent the radio control transmitter from causing interference.

The radio control transmitters A and B shown in FIG. 1 are constructed in the same manner. For example, they may be constructed in such a manner as shown in FIG. 2.

More particularly, the radio control transmitter includes a power control section 1 including a power control circuit 2, a holding circuit 3 and a power feed discriminating circuit 4. The power control circuit 2 functions to control electronic switches SW2, SW3 and SW4 and the holding circuit 3 functions to hold a result of discrimination by the power feed discriminating section 4 therein. The power feed discriminating circuit 4 discriminates which of an external power supply and an internal power supply feeds a power to the radio control transmitter. The radio control transmitter also includes a high-frequency or radio-frequency circuit 5 for modulating an output of an encoder circuit 6 and outputting it in the form of a radio wave and a rod antenna 8 for transmitting the radio wave therefrom. The encoder circuit 6 functions to encode the amount of operation of each of sticks or the like.

Figure 2:
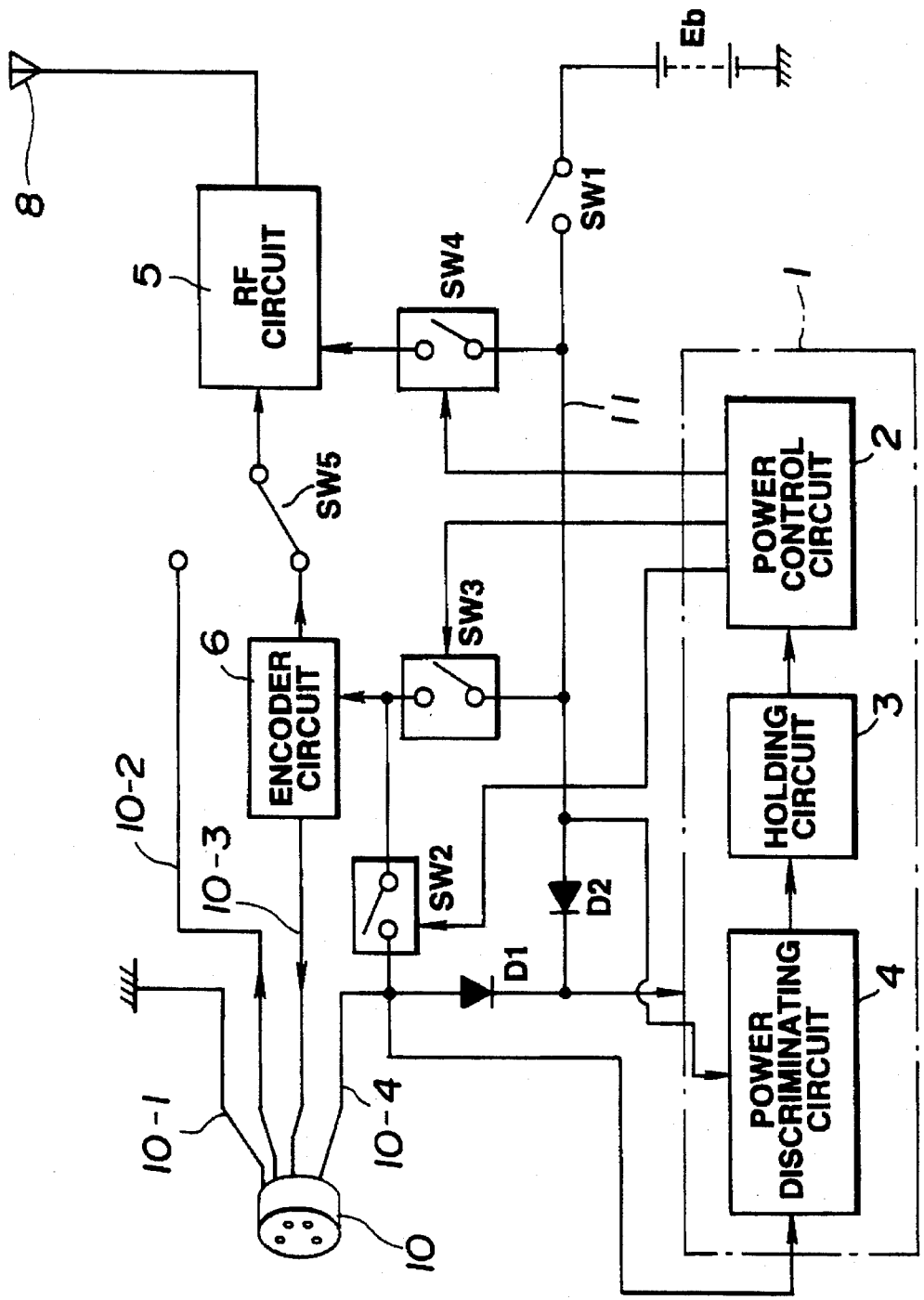
FIG. 2 is a block diagram showing an embodiment of a radio control transmitter according to the present invention.

Also, in FIG. 2, reference numeral 10 designates a connector to which a trainer cable (not shown) is connected. 10-1 is an earth line, 10-2 is a second line acting as an encoder signal line, 10-3 is a third line acting as an encoder signal output line and 10-4 is a first line acting as a power transmission line. 11 is a power line through which a power of a power source Eb is fed. Sw1 is a power switch, Sw3 and SW4 each are an electronic switch acting as a first switch for feeding the power to the encoder circuit 6 and radio-frequency circuit 5, SW2 is an electronic switch acting as a second switch which permits a power to be fed from an external power supply through the power transmission line 10-4 to the encoder circuit 6, SW5 is a trainer switch or a third switch, and D1 and D2 each are a check diode.

In the radio control transmitter thus constructed, closing of the power switch SW1 of one radio control transmitter shown in FIG. 2 causes the power of the power supply Eb to be applied through the switch SW1 and diode D2 to the power control section 1, leading to activation of the power control section 1.

This results in the power feed discriminating circuit 4 carrying out comparison between a voltage applied to the power transmission line 10-4 and that applied to the power line 11, so that a result of the discrimination may be output therefrom. When any voltage does not appear on the power transmission line 10-4, the power feed discriminating circuit 4 outputs a discrimination result of, for example, "H".

The discrimination result "H" output from the circuit 4 is then applied to be holding circuit 3, resulting in being held therein and fed to the power control circuit 2. This causes the power control circuit 2 to control the electronic switches SW2, SW3 and SW4, so that the switches are kept turned on.

This results in the power of the power supply Eb being applied through the electronic switch SW3 to the encoder 6 and through the electronic switch SW4 to the radio-frequency circuit 5, leading to activation of the encoder circuit 6 and radio-frequency circuit 5. Also, the power of the power supply Eb is applied through the electronic switch SW2 and SW3 to the power transmission line 10-4, so that the power is transmitted to the other radio control transmitter through the connector 10 and the trainer cable (not shown) connected thereto.

Application of the power of the power supply Eb to the power transmission line 10-4 described above may possibly cause the output of the power feed discriminating circuit A to be unstable. However, the holding circuit 3 functions to permit data previously held therein to be kept held, so that control by the power control circuit may be maintained.

At this time, when the switch SW5 is at a position shown in FIG. 2, operation of the sticks of the radio control transmitter permits an airplane or the like to be controlled.

When the switch SW5 is changed over, the radio-frequency circuit 5 is connected to the encoder signal line 10-2, so that operation of the sticks of the other radio control transmitter connected to the one radio control transmitter of FIG. 2 through the trainer cable permits the airplane or the like to be controlled.

Thus, when the power switch SW1 of the one radio control transmitter is closed in advance of the power switch of the other radio control transmitter, the one radio control transmitter is permitted to act as a teacher-side radio control transmitter.

Now, the manner of operation of the illustrated embodiment will be described hereinafter supposing that the power switch of the other radio control transmitter is closed in advance of that of the one radio control transmitter.

When the power switch of the other radio control transmitter is first closed, a power of the power supply is transmitted through the trainer cable to the power transmission line 10-4 as in FIG. 2. The power is applied through the diode D1 to the power control section 1, to thereby activate the power control section 1.

This results in the power feed discriminating circuit of the power control section 1 carrying out comparison between a voltage applied to the power transmission line 10-4 and that of the power line 11 to output a result of the discrimination. At this time, the power of the power supply Eb does not appear on the power line 11, so that the discrimination result is "L" contrary to the above-described result "H". Thereafter, the discrimination result "L" is held in the holding circuit 3 and applied to the power control circuit 2. Then, the power control circuit 2 controls the electronic switches SW3 and SW4 to turn off them and controls the electronic switch SW2 to turn on This causes the encoder 6 to be fed with the transmitted power, resulting in being activated. However, the radio-frequency circuit 5 is not activated because it is kept from being fed with the power. At this time, when the power switch SW1 is closed the power of the power supply Eb is applied to the power feed discriminating circuit 4, therefore, there may be a possibility that output of the discrimination result of the power feed discriminating circuit 4 is rendered unstable. However, the holding circuit 3 operates to permit the signal which has been already held therein to be kept held therein, so that control by the power control circuit 2 may be effectively maintained. This causes the radio-frequency circuit 5 to be kept from being activated, to thereby be prevented from outputting a radio wave.

The encoder 6 is kept activated. Therefore, when the trainer switch of the other radio control transmitter is changed over, operation of the stick encoded by the encoder circuit 5 causes an encode signal to be transmitted through the encode signal output line 10-3 to the other radio control transmitter and then output in the form of s radio waver from the other radio control transmitter, leading to control of an airplane or the like.

Thus, the one radio control transmitter is permitted to be a pupil-side radio control transmitter.

Removal of the trainer cable from the connector 10 causes the power control circuit to operate so as to keep the electronic switches SW2, SW3 and SW4 constantly turned on, so that the radio control transmitter may be used in the same manner as a normal radio control transmitter.

Now, the holding circuit 3 and power feed discriminating circuit 4 will be described with reference to FIG. 3.

Figure 3:
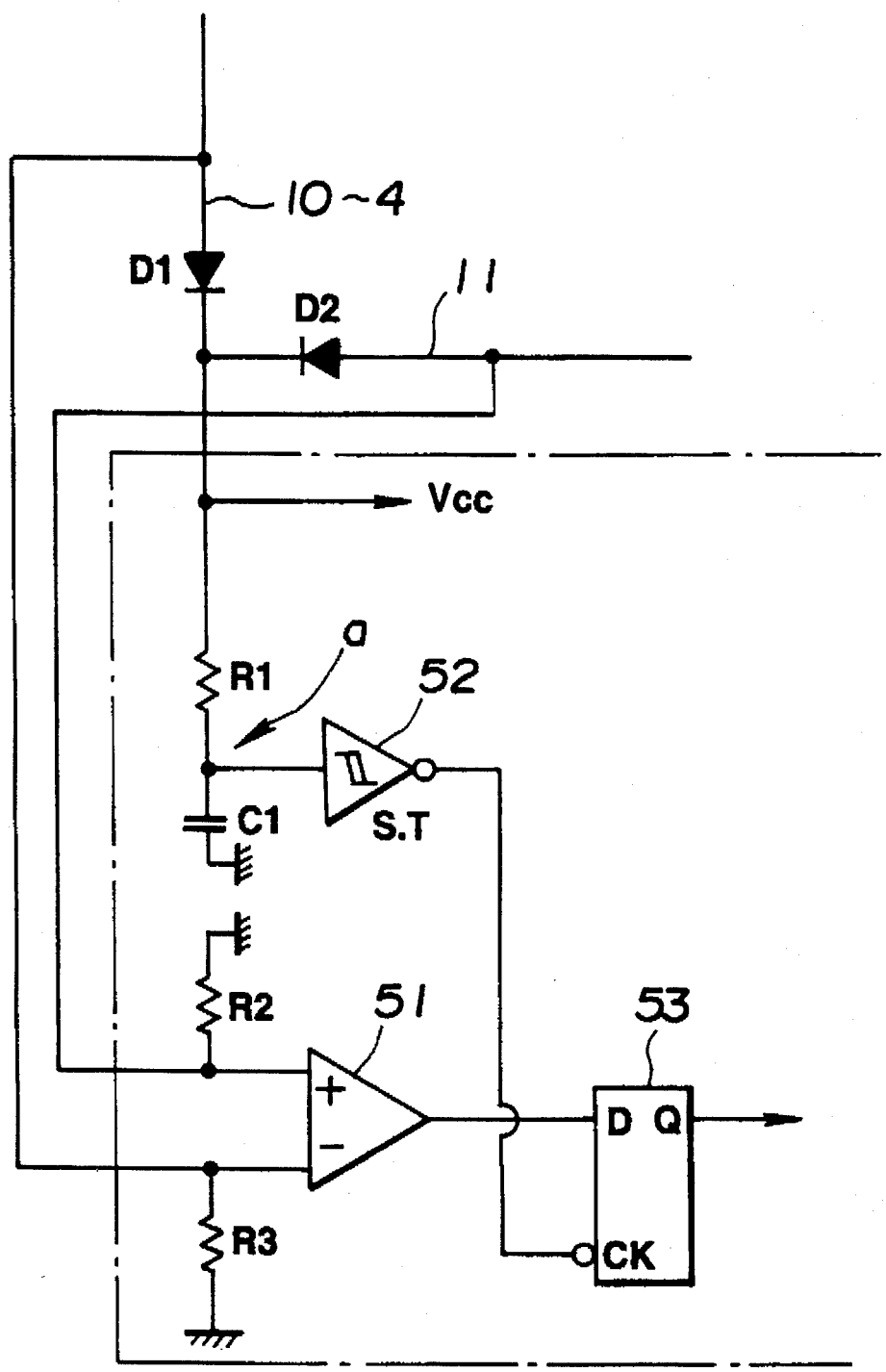
FIG. 3 is a circuit diagram showing a power feed discriminating circuit and a holding circuit incorporated in the radio control transmitter shown in FIG. 2.

In FIG. 3, reference numerals 10-4 and 11 are the power transmission line and power line described above, respectively. 51 designates a comparator for carrying out comparison between a voltage applied to the power transmission line 10-4 and that of the power line 11, 52 is a Schmitt trigger circuit for shaping an output of an integration circuit comprising a resistor R1 and a capacitor Cl, and 53 is a D-type flip-flop (hereinafter also referred to as "FF"). D1 and D2 each are the check diode, as described above. The resistor R1 acts as an integration resistor in the integration circuit functioning as a delay circuit. R2 and R3 each are a resistor for preventing an input terminal of the comparator 51 from being kept open and C1 is an integration capacitor in the integration circuit.

Now, the manner of operation of the holding circuit 3 and power feed discriminating circuit 4 will be described hereinafter with reference to FIGS. 4(a) to 4(d) showing waveforms obtained at parts of the radio control transmitter when the power is first applied to the power line 11. More particularly, FIG. 4(a) is a waveform of an integration voltage at a connection a between the resistor R1 and the capacitor C1 FIG. 4(b) is a waveform of an output of the Schmitt trigger circuit, FIG. 4(c) is a waveform of an output of the comparator 51, and FIG. 4(d) is a waveform of an output of the PF 53.

When the power is applied to the power line 4 in advance of the power transmission line 10-4 at time to, the power is then applied to a non-inversion input terminal of the comparator 51, as well as through the diode D2 to the integration circuit comprising the resistor R1 and capacitor 81, resulting in being subject to integration.

An integration voltage obtained at the connection a commences to rise at the time to as shown in FIG. 4(a). Then, when it exceeds an inversion level Er of the Schmitt trigger circuit, an output of the Schmitt trigger circuit 52 is inverted, resulting in falling at time t1 later than the time to as shown in FIG. 4(b). The output of the Schmitt trigger circuit 52 is input to a non-inversion clock terminal of the FF 53, so that the trailing edge of the output of the Schmitt trigger circuit causes the FF 53 to read a signal input to a D terminal thereof. At this time, the D terminal of the FF 53 has an output of the comparator 51 having a level "B" applied thereto, so that a Q output of the FF 53 has the level "H".

Outputting of the level "H" by the comparator 51 due to the fact that the power voltage is applied to the non-inversion input terminal of the comparator 51, whereas no voltage is applied to the inversion input terminal thereof.

The output "B" of the FF 53 is applied to a power control circuit (not shown), which carries out predetermined control. Also, even when the power is applied to the power transmission line 10-4 after the signal is read by the FF 53, the output of the Schmitt trigger circuit 52 is prevented from falling, resulting in the output of the FF 53 being maintained.

The power fed through the diode D1 or D2 is used for a device constituting the power control section as indicated at Vcc in FIG. 3.

Thus, the power feed discriminating circuit 4 and holding circuit 3 may be constituted by the integration circuit, Schmitt trigger circuit, comparator and flip flop.

Figure 5:
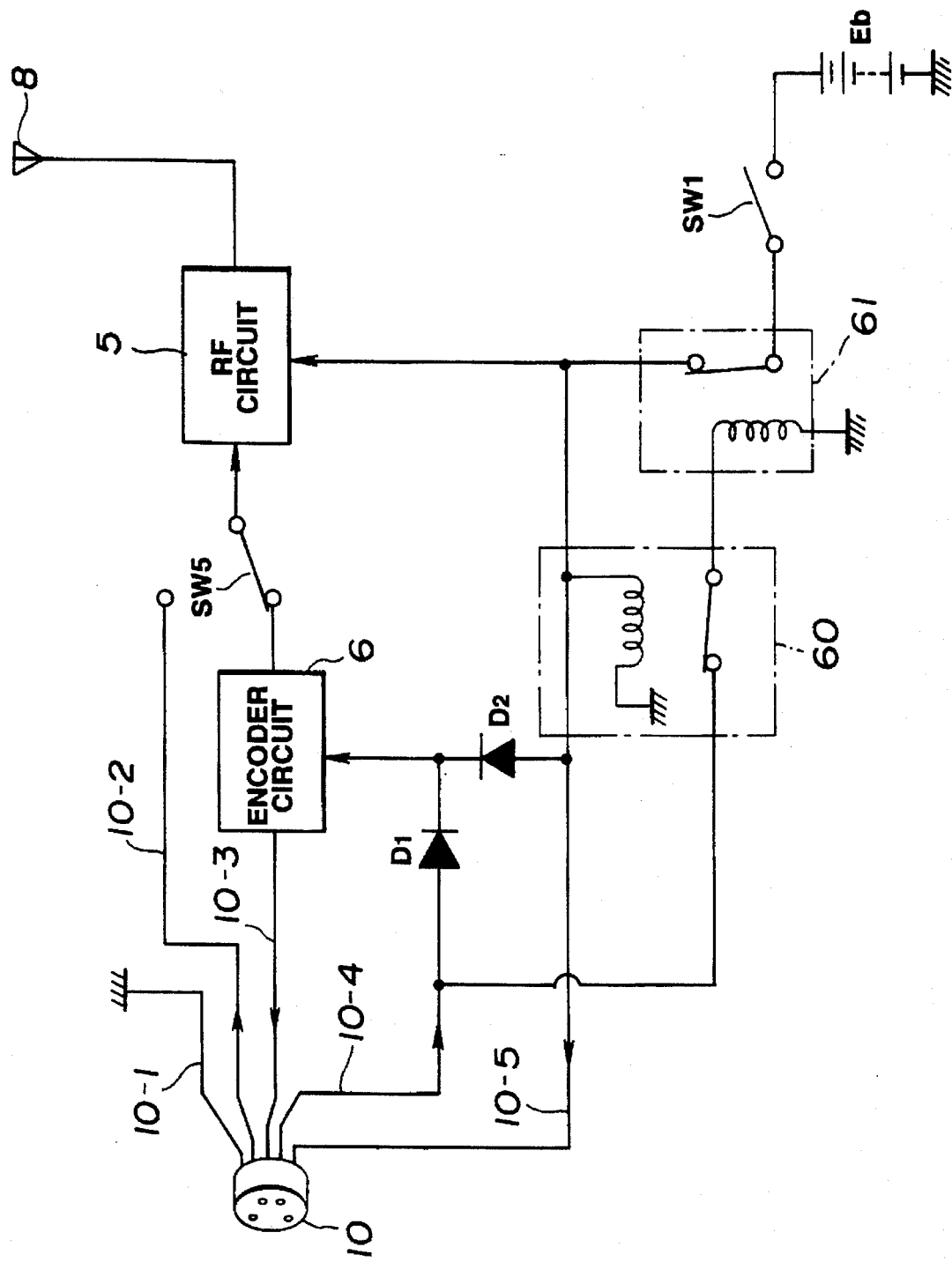
FIG. 5 is a block diagram showing another embodiment of a radio control transmitter according to the present invention.
Figure 6:
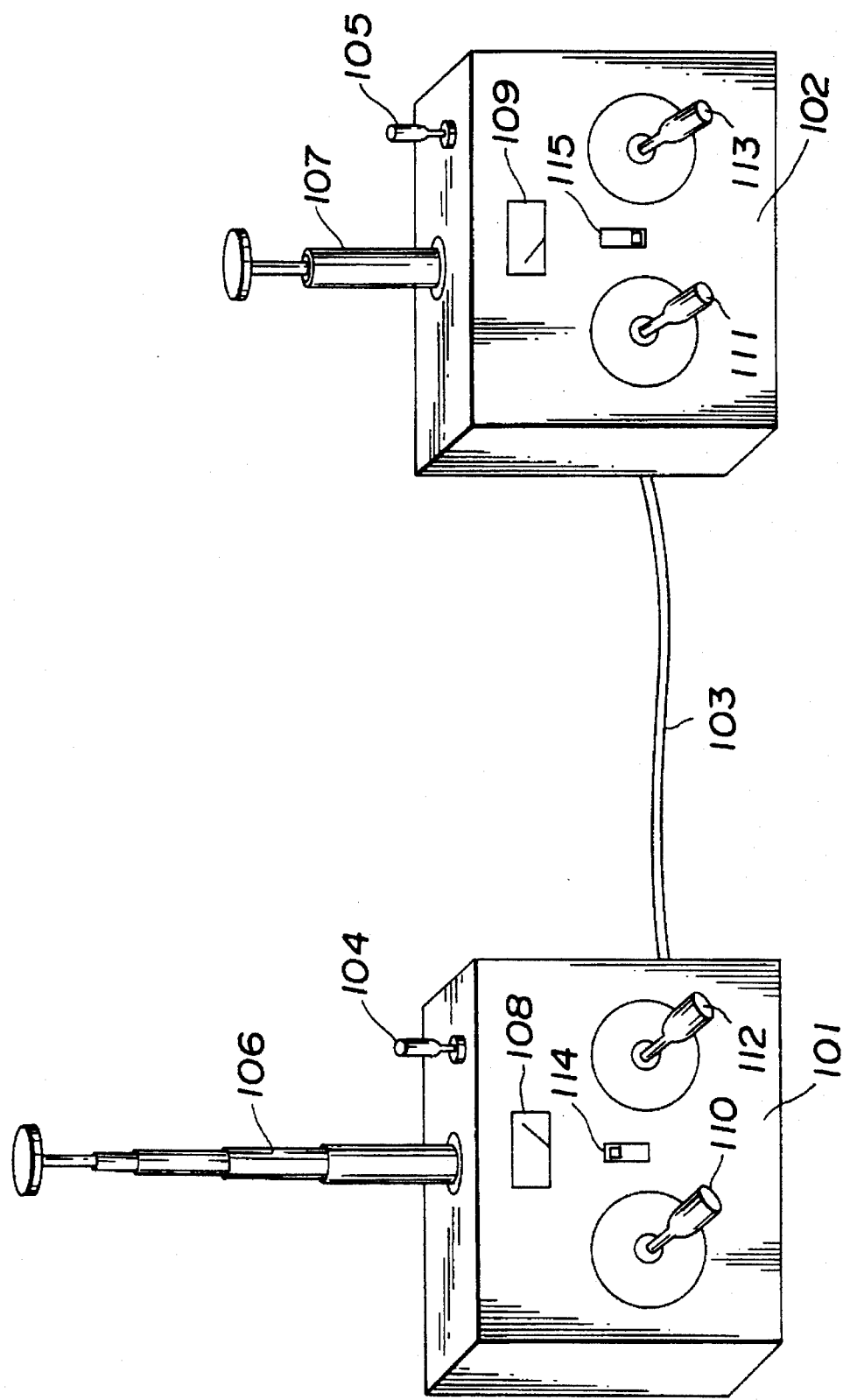
FIG. 6 is a perspective view showing two radio control transmitters connected through a trainer cable for control training of the radio control transmitters.
Figure 7:
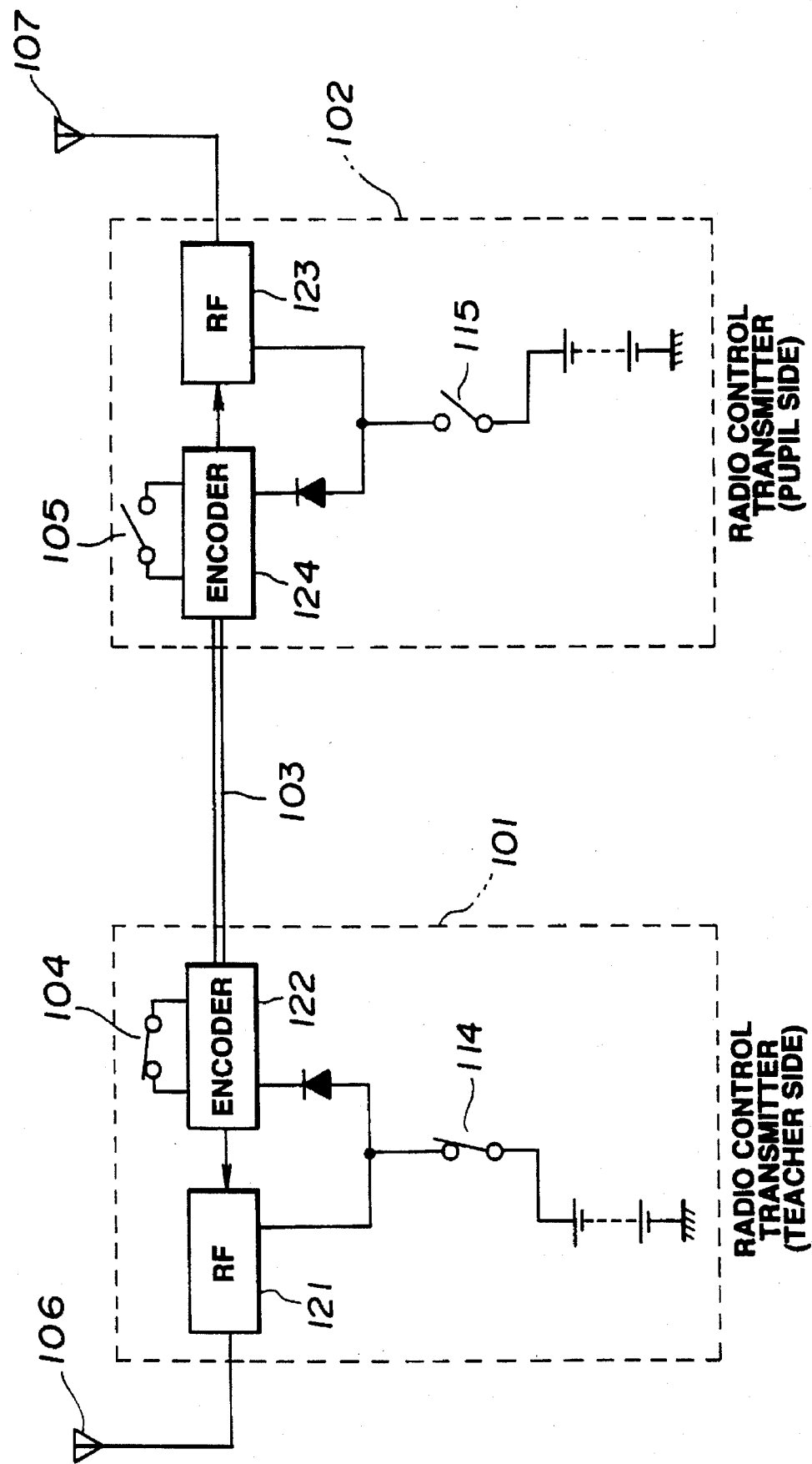
FIG. 7 is a block diagram showing conventional radio control transmitters interconnected through a trainer cable.

Referring now to FIG. 5, another embodiment of a radio control transmitter according to the present invention is illustrated. In the illustrated embodiment, both pupil-side and teacher-side radio control transmitters may be constructed into the same structure, wherein a relay is used for each of switches.

In the illustrated embodiment, a power switch SW1 of a teacher-side radio control transmitter is first closed, a power of a power supply Eb is applied through a second relay 61 to a high-frequency or radio-frequency circuit 5 and an encoder circuit 6. Also, this causes a current to flow through a first relay 60, so that a relay contact of the relay 60 is rendered open.

Thus, the pupil-side radio control transmitter is fed with the power of the power supply Eb as an external power through a power transmission line 10-5 connected to a connector 10. This causes a current to flow across a coil of the second relay 61 through the power transmission line 10-4 and the relay contact of the first relay 60, so that the relay contact is open. Thus in the pupil-side radio control transmitter, the radio-frequency circuit 5 is kept from being fed with the power of the power supply Eb even when the power switch SW1 is closed, so that the pupil-side radio control transmitter is prevented from outputting a radio wave. Besides, the encoder circuit 6 of the pupil-side radio control transmitter is fed with a power through the power transmission line 10-4 from the teacher-side radio control transmitter, so that an output of the encoder 6 may be fed through an encoder output line 10-3 to the teacher-side radio control transmitter.

Thus, in the second embodiment constructed as described above, of the two radio control transmitters interconnected through a trainer cable, the transmitter which is first fed with the power is permitted to be a teacher-side radio control transmitter. Therefore, the second embodiment permits only the teacher-side radio control transmitter to output a radio wave and keeps the pupil-side radio control transmitter from outputting a radio wave.

Changing-over of the trainer switch SW5 causes changing-over from the teacher-side radio control transmitter to the pupil-side one, so that the output of the encoder circuit 6 is fed to the radio-frequency circuit 5 of the pupil-side radio control transmitter, thus, it will be noted that the second embodiment exhibits the same advantage as the first embodiment described above.

As can be seen from the foregoing, the radio control transmitter of the present invention prevents the pupil-side radio control transmitter from outputting a radio wave even when a pupil-side operator erroneously closes the power switch of the pupil-side radio control transmitter, so that a receiver mounted on an airplane or the like is kept from experiencing radio interference, to thereby eliminate crash of the airplane and receiver.

Also, the radio control transmitter of the present invention may be effectively used as a normal radio control transmitter when the trainer cable is detached therefrom.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A radio control transmitter comprising:

an encoder circuit for encoding a stick operation signal;

a radio-frequency circuit for modulating the signal encoded and outputting said signal in the form of a radio wave;

a power supply and a power line connected to said power supply;

a switch arranged between said radio-frequency circuit and said power line;

a connector for external output to which a first line connected to an external power supply, a second line fed with an external signal and a third line connected to an output of said encoder circuit are connected; and a power control section including a power control circuit and a discriminating circuit for judging which of said first line and said power line is serving for power feed by comparing a voltage between said first line and said power line, whereby connection between said radio frequency circuit and said power line is interrupted by said switch when said discriminating circuit judges that said first line is serving for power feed to prevent the radio frequency circuit from outputting a radio wave.

2. A radio control transmitter comprising:

an encoder circuit for encoding a stick operation signal;

a radio-frequency circuit for modulating the signal encoded and outputting it in the form of a radio wave;

a first switch connected between each of said encoder circuit and high-frequency circuit and a power line;

a second switch connected between said encoder circuit and a first line connected to an external power supply;

a power switch connected between a power supply and said power line;

a power feed discriminating circuit for judging which of said first line and power line is serving for power feed;

a holding circuit for holding a signal output from said power feed discriminating circuit;

a power control circuit for controlling said first and second switches depending on a signal output from said holding circuit;

a third switch for selectively applying one of the output signal of said encoder and a signal of a second line to said high-frequency circuit;

a third line connected to an output terminal of said encoder;

a connector for external output to which at least said first, second and third lines are connected;

a power output from said first switch being fed through said second switch to said first line; and a diode connected in a forward direction to said first line so as to feed a power therethrough to said holding circuit and power control circuit.

3. A radio control transmitter as defined in claim 2, wherein said holding circuit holds, until feed of a power thereto is interrupted, an output of said power feed discriminating circuit obtained when any one of said first line and power line is fed with a power.

* * * * *